(12) United States Patent
Henzl et al.

(10) Patent No.: US 9,402,182 B1
(45) Date of Patent: Jul. 26, 2016

(54) AUTOMATED DISTRIBUTION OF LOGON CREDENTIALS FOR ESTABLISHING WIRELESS CONNECTIVITY OF ELECTRONIC FLIGHT BAG (EFB)

(71) Applicant: Honeywell International Inc., Morristown, NJ (US)

(72) Inventors: Martin Henzl, Czech Republic (CZ); Petr Gotthard, Czech Republic (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/599,198

(22) Filed: Jan. 16, 2015

(51) Int. Cl.
| | |
|---|---|
| *H04L 29/06* | (2006.01) |
| *H04W 12/06* | (2009.01) |
| *H04B 5/00* | (2006.01) |
| *H04W 12/08* | (2009.01) |
| *H04L 29/08* | (2006.01) |

(52) U.S. Cl.
CPC ............. *H04W 12/06* (2013.01); *H04B 5/0025* (2013.01); *H04L 63/0492* (2013.01); *H04L 63/08* (2013.01); *H04L 67/10* (2013.01); *H04W 12/08* (2013.01)

(58) Field of Classification Search
CPC .................. B64D 2045/0075; B64D 45/00
See application file for complete search history.

(56) References Cited

U.S. PATENT DOCUMENTS

| | | |
|---|---|---|
| 8,495,722 B1 | 7/2013 | McCusker |
| 8,792,936 B2 | 7/2014 | Rajendran et al. |
| 2006/0251256 A1 | 11/2006 | Asokan et al. |

(Continued)

FOREIGN PATENT DOCUMENTS

| | | |
|---|---|---|
| CA | 2831509 | 1/2014 |

OTHER PUBLICATIONS

Fitchard, "Wi-Fi teams up with NFC to create secure connections with a simple tap", "Retrieved Dec. 18, 2014 from https://gigaom.com/2014/04/09/wi-fi-teams-up-with-nfc-to-create-secure-connections-with-a-simple-tap/", Apr. 9, 2014, pp. 16.

(Continued)

*Primary Examiner* — Jason K Gee
(74) *Attorney, Agent, or Firm* — Fogg & Power LLC

(57) ABSTRACT

Automated distribution of wireless logon credentials for an electronic flight bag (EFB) is provided. In one embodiment, a method for secured aircraft wireless network access comprises: establishing a NFC link between an EFB and an NFC node, wherein the node is hardwired to a wireless access point coupled to EFB service applications via an aircraft network. The access point provides a plurality of wireless channels for accessing the network, each are single user wireless channels. In response to a request from the EFB, determining whether a first wireless channel is available; if the first wireless channel is available, generating a logon credential associated with the first wireless channel and transmitting the credential to the EFB with the NFC node; establishing a second link between the EFB and the wireless access point using the credential; and transferring data between the EFB and EFB server applications over the second link.

20 Claims, 3 Drawing Sheets

(56) References Cited

U.S. PATENT DOCUMENTS

| | | |
|---|---|---|
| 2008/0086637 A1 | 4/2008 | Royalty |
| 2013/0309971 A1* | 11/2013 | Kiukkonen ........... H04L 63/107 455/41.2 |
| 2014/0059351 A1 | 2/2014 | Braskich et al. |
| 2014/0282684 A1 | 9/2014 | Keen et al. |
| 2014/0298024 A1* | 10/2014 | Wendling ............. H04L 63/063 713/171 |
| 2015/0120097 A1* | 4/2015 | Hathaway ............... B64C 19/00 701/14 |
| 2015/0244422 A1* | 8/2015 | Ohashi ................ H04B 5/0081 455/41.1 |
| 2015/0327307 A1 | 11/2015 | Randrianasolo et al. |

OTHER PUBLICATIONS

Shemaili et al., "Smart RFID Security, Privacy and Authentication", 2012.

European Patent Office, "Extended European Search Report from EP Applicaiton No. EP 16150505.2 mailed May 11, 2016", from Foreign Counterpart of U.S. Appl. No. 14/599,198, May 11, 2016, pp. 1-8, Published in: EP.

\* cited by examiner

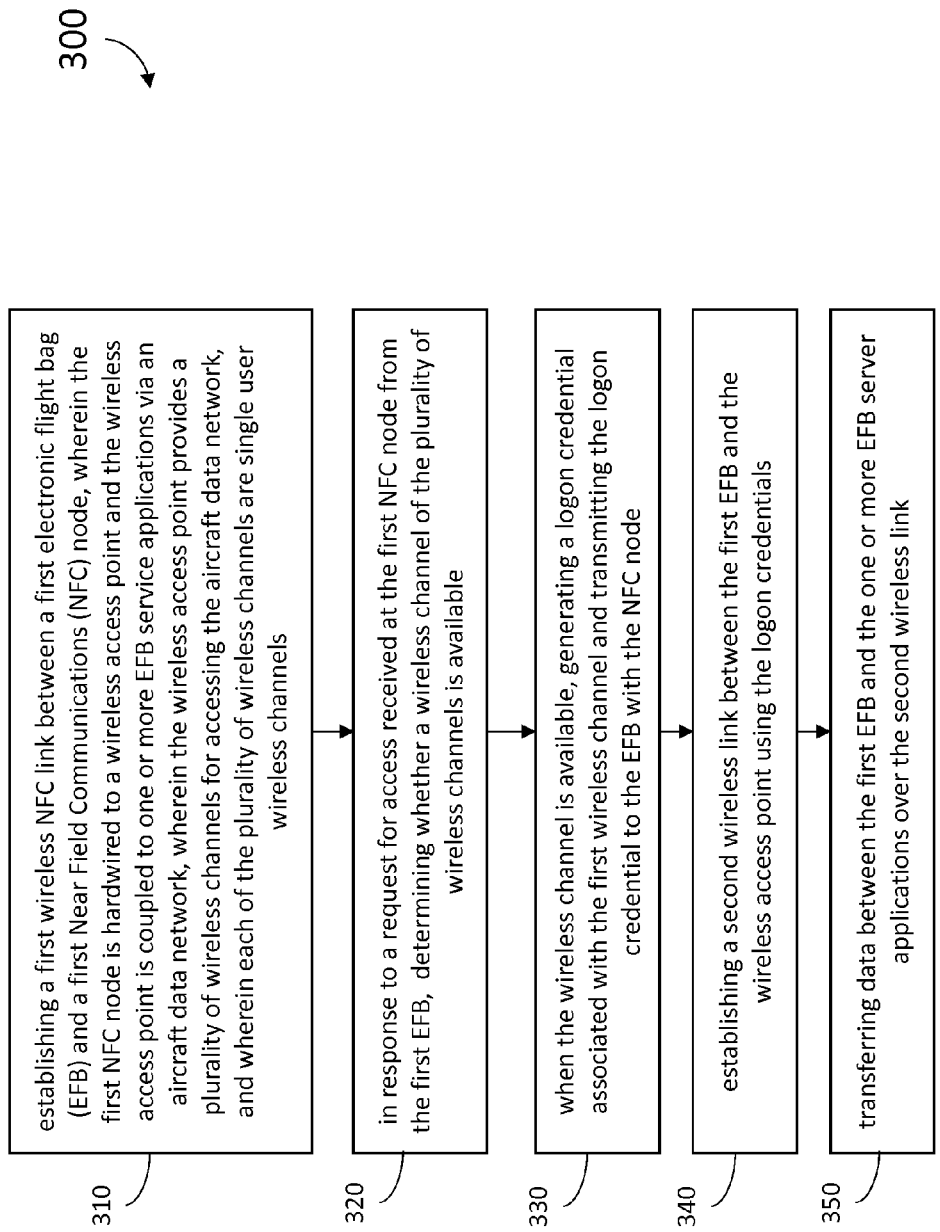

AUTOMATED DISTRIBUTION OF LOGON CREDENTIALS FOR ESTABLISHING WIRELESS CONNECTIVITY OF ELECTRONIC FLIGHT BAG (EFB)

BACKGROUND

An Electronic Flight Bag (EFB) is a handheld mobile computing device carried by aircraft flight crews that reference materials such as aircraft operating manuals, flight-crew operating manuals, navigational charts, weather forecasts, flight schedules, and the like. Usually, the Electronic Flight Bag is a resource intended primarily for cockpit use by the flight crew's pilot and co-pilot. Contents on the electronic flight bag may be updated while on-board an aircraft by connecting the electronic flight bag to an on-board aircraft network which includes an on-board EFB data server. The most secure way of connecting EFB to the on-board aircraft network is by using a cable, because the adversary would have to gain physical access to the connector, which is situated in cockpit, hence under control of pilots. Further, a cable provides a hardwired point-to-point connection that ensures only one EFB device can be connected to the on-board aircraft network at any one time. However, cables can fail, tangle, and can be a source of clutter on the flight deck. Wireless links, such as those provided by dedicated Wi-Fi (i.e., IEEE 802.11) access points are one means to avoid the need for hardwire cable connections. Such wireless connections, however, introduce security issues because their signals are not restricted to the cockpit, and logon credentials can be hacked or stolen by an attacker eavesdropping on the access point enabling the attacker to connect to the dedicated Wi-Fi network.

For the reasons stated above and for other reasons stated below which will become apparent to those skilled in the art upon reading and understanding the specification, there is a need in the art for alternate systems and methods for providing automated secure distribution of logon credentials for establishing wireless connectivity of Electronic Flight Bags.

SUMMARY

The Embodiments of the present invention provide methods and systems for providing automated secure distribution of logon credentials for establishing wireless connectivity of Electronic Flight Bags and will be understood by reading and studying the following specification.

In one embodiment a method for secured aircraft wireless network access comprises: establishing a first wireless NFC link between a first electronic flight bag (EFB) and a first Near Field Communications (NFC) node, wherein the first NFC node is hardwired to a wireless access point and the wireless access point is coupled to one or more EFB service applications via an aircraft data network, wherein the wireless access point provides a plurality of wireless channels for accessing the aircraft data network, and wherein each of the plurality of wireless channels are single user wireless channels; in response to a request for access received at the first NFC node from the first EFB, determining whether a wireless channel of the plurality of wireless channels is available; when the wireless channel is available, generating a logon credential associated with the first wireless channel and transmitting the logon credential to the EFB with the NFC node; establishing a second wireless link between the first EFB and the wireless access point using the logon credential; and transferring data between the first EFB and the one or more EFB server applications over the second wireless link.

DRAWINGS

Embodiments of the present invention can be more easily understood and further advantages and uses thereof more readily apparent, when considered in view of the description of the preferred embodiments and the following figures in which:

FIG. 3 is a flowchart illustrating a method for a secured aircraft wireless network access system of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments disclosed herein reduces the chances that an unauthorized party onboard an aircraft can obtain wireless access point login credentials used by flight crew members to wirelessly connect their Electronic Flight Bag (EFB) to the aircraft's data network. These embodiments limit the number of simultaneously connected devices which may wirelessly connect to the aircraft's data network in order to enable only authorized EFBs to be connected and refuse all other potentially harmful connections.

The AES encryption used by Wi-Fi access points is currently the best widely available wireless communication protection and cannot be broken in reasonable time but there is a difficulty with respect to secure key storage and key distribution. However, wireless access point login credentials should not be stored in a pilot's EFB, since these device are personal items carried by the pilots and will leave the aircraft, and may be left unattended. This leaves the devices vulnerable to an attacker that can install malware or access sensitive keys, rendering EFBs not-trusted devices. Another possibility is to have the pilot manually enter wireless access point login credentials after the pilots board the aircraft. The login credentials can be memorized by the pilots or written on a piece of paper. Both these possibilities should be avoided because of very low level of security—pilots should not be expected to remember complex passwords, and passwords written on a piece of paper can be easily copied by an attacker who may see the paper. Additionally, typing long password to the EFB on board the aircraft would be unnecessary burden for pilots.

The embodiments proposed in the present disclosure solve the problem of protecting logon credentials against unauthorized use. As explained in greater detail below, connecting an EFB to the aircraft's data network via a wireless access point will be possible only from aircraft's cockpit. The logon credential will be loaded to the device in the cockpit without the need of typing long password.

Figure 1:
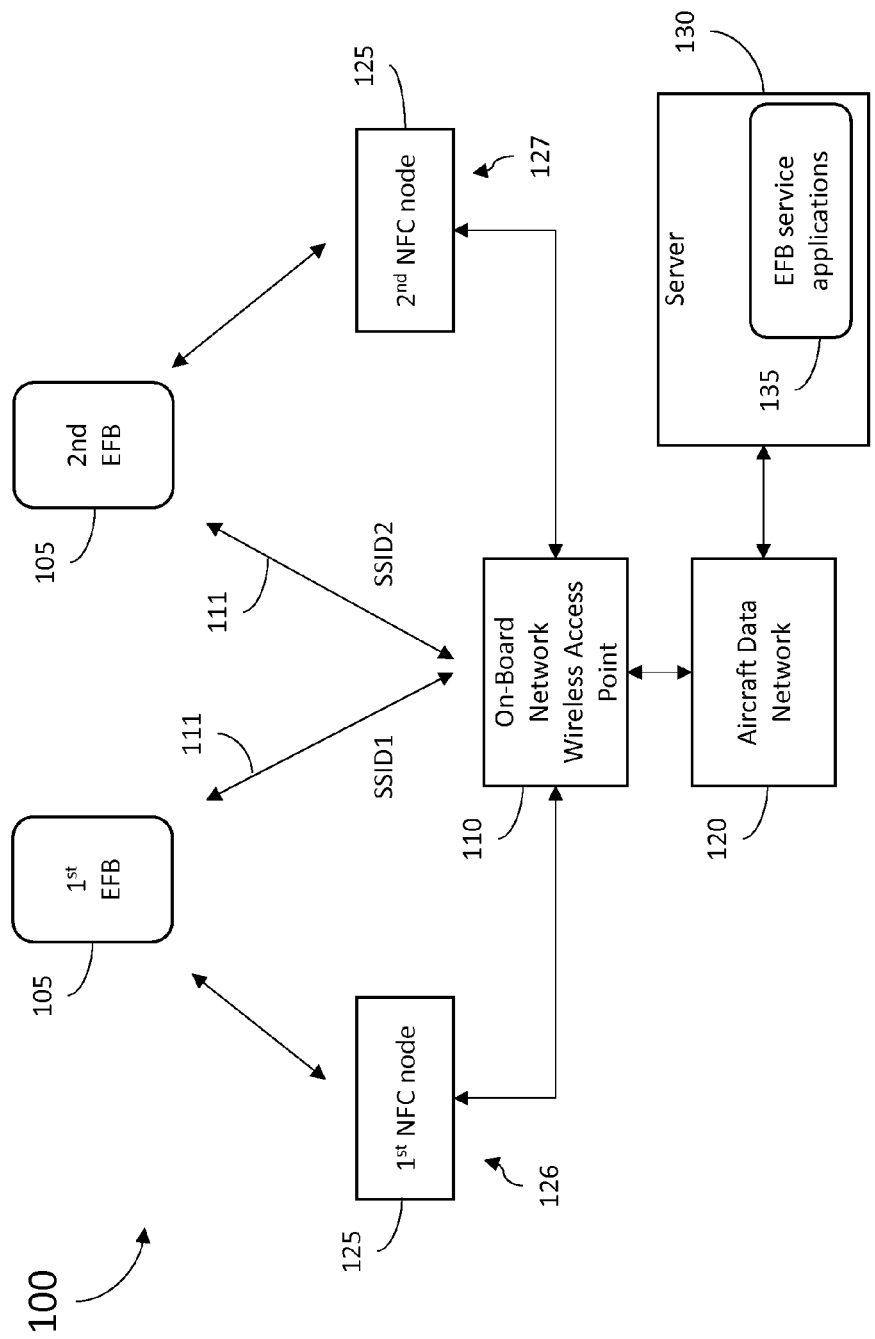
FIG. 1 is a diagram illustrating a secured aircraft wireless network access system of one embodiment of the present disclosure.

FIG. 1 is a diagram illustrating a secured aircraft wireless network access system 100 of one embodiment of the present disclosure. Using system 100, a pilot in possession of an Electronic Flight Bag (EFB, such as shown at 105) and operating the EFB 105 from within the aircraft's cockpit can securely and wirelessly connect to the aircraft data network 120 to exchange data with one or more EFB service applications 135. Aircraft data network 120 may be implemented as a wired network, or at least in part implemented using a wireless network. As the term is used herein, an "EFB service application" is defined with any application configured to send or receive data with an EFB 105 regardless as to whether the application may perform other functions. Further, the terms electronic flight bag and EFB may include any mobile computing device in the possession of a pilot which may be authorized to connect to the aircraft data network 120 from within the aircraft cockpit. Also, although the term "pilot" is used through-out this disclosure, it should be appreciated that term generally is not intended to only refer to a flight crew captain, but may, consistent with the context of a particular passage, apply to other flight crew officers. That is, any act, task, function, selection, etc., described herein as being associated with a pilot action could in fact be performed by another flight crew member regardless of whether that member is a pilot or non-pilot.

More specifically, system 100 comprises an on-board wireless access point 110 coupled by a hardwired connection to the aircraft data network 120. In one embodiment, wireless access point 110 comprises a Wi-Fi (i.e., IEEE 802.11 standard) compatible access point. Ideally, the wireless access point 110 is located in the cockpit of the aircraft, but in other embodiments may be located elsewhere on-board the aircraft but wirelessly accessible by mobile devices in the cockpit. Network 120 comprises a network that is further coupled to at least one server 130, which may comprise a computer system executing the one or more EFB service applications 135. The at least one server 130 will often be located on-board the aircraft, but in some embodiments may instead be implemented at a ground facility in communication with the aircraft such as through satellite communications (SATCOM). Wireless access to network 120 is achievable through one or more single user wireless channels (shown at 111) provided by wireless access point 110. That is, while wireless access point 110 may provide multiple wireless channels, each of those wireless channels has a unique Service Set Identifier (SSID) for example, SSID1 and SSID2, and will support only one wireless connection to one EFB 105.

System 100 further comprises a pair of Near Field Communication (NFC) nodes 125, each hardwire coupled to the wireless access point 110. In some embodiments, one of the NFC nodes 125 (such as shown at 126) is located at the Pilot's (or Captain's) station which the other (shown at 127) is located at the co-Pilot's (or First Officer's) station. NFC devices 125 support very short range communications, which in this application is advantageous as the limited communication range prevents unauthorized communication with the NFC nodes 125 from outside of the cockpit. For example, in one embodiment, the NFC nodes 125 operates at a frequency of 13.56 MHz and have a maximum operating range of about 10 cm. In some embodiments, NFC nodes 125 are compliant or otherwise compatible with one or more of ISO/IEC 14443, ISO/IEC 18000-3, ISO/IEC 18092/ECMA-340 (Near Field Communication Interface and Protocol-1) and/or ISO/IEC 21481/ECMA-352 (Near Field Communication Interface and Protocol-2)

The communication link between an EFB 105 and the wireless access point 110 is secured and encrypted so that an EFB 105 requesting access to wireless access point 110 must present proper logon credentials before being granted access. The logon credentials may be in the form of a pre-share key, or IEEE 802.1X authentication credentials, for example, or other authentication methods. With embodiments of the present invention, the logon credentials are loaded to an EFB 105 automatically in cockpit after the pilot puts the EFB 105 in the proximity of an NFC node 125. After receiving the logon credentials, the EFB 105 is immediately able to authenticate itself with wireless access point 110 and connect with the EFB service applications 135.

More specifically, in one embodiment in operation, the pilot places an EFB 105 into the proximity of an NFC node 125 to send a request for access to the access point 110. In one embodiment, server authentication may optionally be employed by EFB 105 to ensure that it is connecting to a valid NFC node 125 rather than a rogue NFC device. Such a scenario could occur, for example, when EFB 105 is take off the aircraft by the pilot between flights. If the EFB 105 were provided logon credentials by a rogue NFC device, the EFB could be tricked into connected to a rogue Wi-Fi access point that would open the EFB 105 up to security risks. By using server authentication, EFB 105 can ensure that the logon credentials it receives via NFC come from a trusted source. Similarly, client authentication may be optionally employed by NFC node 125 to ensure it is communicating with a legitimate EFB rather than a rogue EFB. For example, the EFB 105 may authenticate itself with the NFC node 125 and then send a request for access to the access point 110. In one embodiment, the NFC node 125 verifies that the EFB 105 is an authorized device prior to accepting such requests. This may be accomplished by verifying cryptographically that the EFB 105 possesses a valid not-revoked certificate.

The request for access initiated by EFB 105 via NFC node 125 is sent to the wireless access point 110, which then generates a fresh set of logon credentials valid for one of the wireless channels 111 provided by the wireless access point 110. The NFC node 125 will then provide the requesting EFB 105 with the fresh logon credentials and the SSID of the wireless channel it is authorized to access. In one embodiment, the wireless channel is a single user wireless channel limited to a single connected user at any one time. A single user wireless channel may be implemented, for example, by configuring DHCP services to provide only one IP address per wireless channel.

In some implementations the NFC node 125 optionally transmits the fresh logon credentials back to the EFB using an encrypted format. Although eavesdropping on an NFC communication in an aircraft environment would be difficult, encryption of the logon credentials may be used to mitigate concerns regarding passive eavesdropping. It would not be possible for an adversary to connect to wireless access point 110 using such stolen credentials because only one device can be connected to one SSID at one particular point in time. However, it would be possible for the adversary possessing the credentials to sniff the Wi-Fi client association and then decrypt the following communication over Wi-Fi. For example, if an adversary knows the WPA2 pre-shared key and has the opportunity to witnesses the client association, the potential exists that the adversary can then decrypt the whole communication. Transmitting the logon credentials over NFC to the EFB 105 in an encrypted format guards against such potential threats.

In one embodiment, in order to guarantee that no one who entered the cockpit previously in the past will be able to re-connect to wireless access point 110 with an old credential, the logon credentials are freshly generated before each connection. That is, once the connection between an EFB 105 and wireless access point 110 is terminated, the logon credentials provided to the EFB 105 for that wireless channel are voided. When that occurs, no access to network 120 via that wireless channel are possible until new logon credentials are generated in response to an access request from an EFB 105 placed into proximity with NFC node 125. In other embodiments, the logon credentials provided to an EFB 105 remain valid for some duration, such as the duration of a specific flight, for example.

Because wireless access point 110 limits use of an wireless channel to only one EFB 105 at a time, should a second EFB 105 request access to wireless access point 110, it may need to use another wireless channel (if another wireless channel is available). For example, in one embodiment, if the pilot initiates the above procedure, that pilot's EFB 105 will obtain access to the EFB service applications 135 using a first wireless channel (e.g. SSID1). If the co-pilot then subsequently attempts to access the above procedure, SSID 1 will be in use and not available. In that situation, when the co-pilot requests access, the wireless access point 110 generates a fresh set of logon credentials to a second wireless channel (e.g. SSID2). The NFC node 125 will then provide the co-pilot's EFB 105 with the fresh logon credentials for SSID2. In this way, system 100 can set a limit on the total number of EFBs that can connect to the network 120 at any one time. That is, if wireless access point 110 is setup to provide a maximum of two single use wireless channels, then the total number of EFB 105s which can access network 120 using wireless access point 110 is limited to two. In some embodiments, there may be only a single NFC node 125 provided in the cockpit (e.g., in a location within the cockpit convenient to both the pilot and co-pilot). In that case, each pilot initiates access through that single NFC node 125.

In some embodiments, wireless channel assignment is position sensitive. That is, each NFC node 125 in the cockpit is associated with a specific SSID for a wireless channel provided by wireless access point 110. For example, if an EFB 105 initiates its request for access from the first NFC node shown at 126, it will be assigned logon credentials for the wireless channel associated with the NFC node at 126 (i.e. "SSID1"). Similarly, if an EFB 105 initiates its request for access from the second NFC node shown at 127, it will be assigned logon credentials for the wireless channel associated with the NFC node at 127 (i.e. "SSID2"). In this way, there can be a wireless channel that remains dedicated for an EFB 105 that initiates login from the pilot position within the cockpit, and another wireless channel that remains dedicated for an EFB 105 that initiates login from the co-pilot position within the cockpit.

Figure 2:
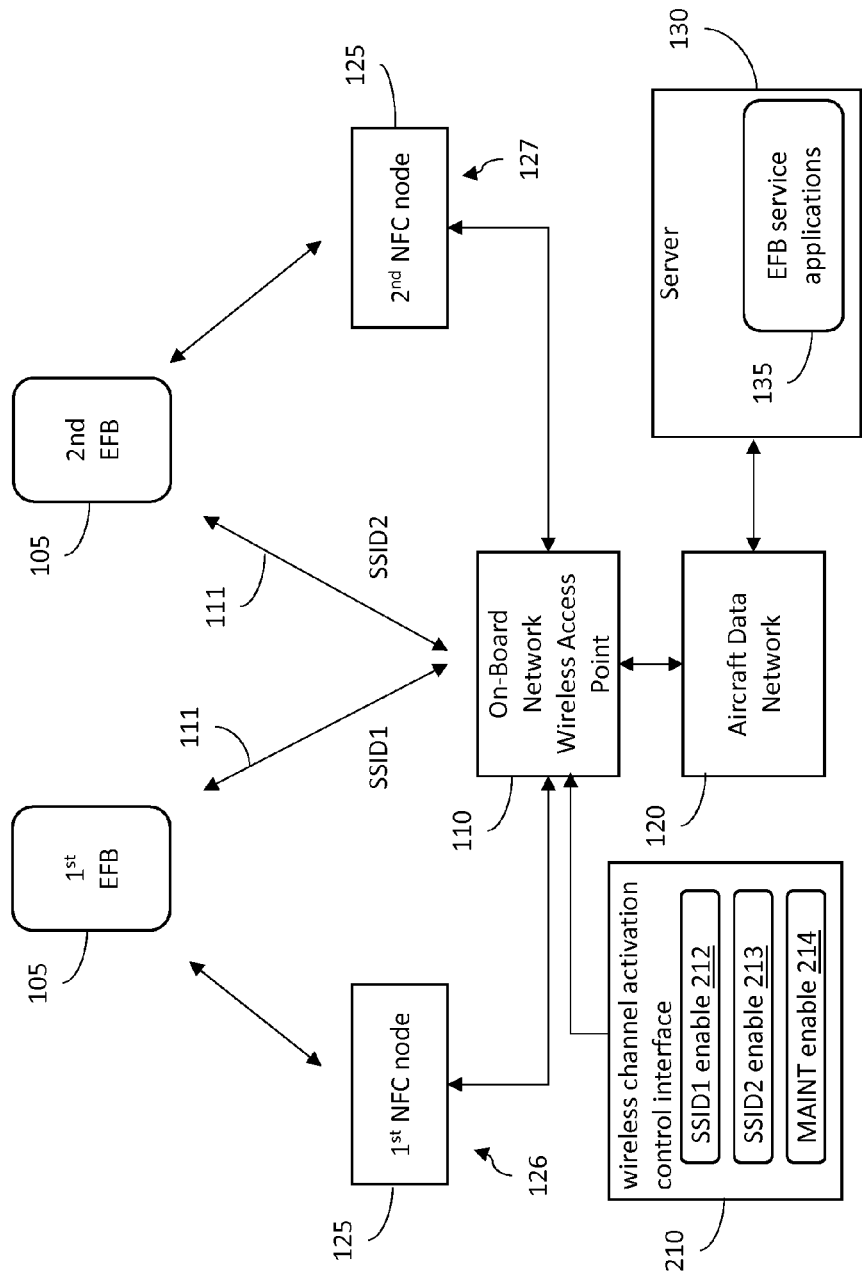
FIG. 2 is a diagram illustrating a secured aircraft wireless network access system of one embodiment of the present disclosure.

In yet another embodiment, illustrated in FIG. 2, the secured aircraft wireless network access system 100 further includes pilot controlled wireless channel activation control interface 210. Using these controls, the pilot has full control over how many wireless channels and/or which particular wireless channels and SSIDs are made available by wireless access point 110. For example, the pilot using wireless channel activation control interface 210 may choose to maintain in an off state all wireless channels available from access point 110. Then, when the need arrives to couple the pilot's EFB 105 to the EFB service applications 135, the wireless channel activation control interface 210 are used to active one wireless channel. The pilot touches the EFB 105 to an NFC node 105, receives logon credentials via NFC node 105, and immediately connects to wireless access point 110 and exchanges data with the EFB service applications 135.

For an embodiment where position sensitive wireless channel assignment is implemented, the pilot may use wireless channel activation control interface 210 to activate a specific wireless channel associated with a specific one of the NFC nodes 105. Only SSIDs for those wireless channels selected to be active may be used. The pilot may again choose to use wireless channel activation control interface 210 to maintain all wireless channels available from access point 110 in an off state. Then, when the need arrives to couple the pilot's EFB 105 to the EFB service applications 135, the pilot may use the wireless channel activation control interface 210 to active the specific wireless channel associated with the NFC node 126 located near the pilot's position in the aircraft (in this case, SSID1). The pilot touches the EFB 105 to NFC node 106, receives logon credentials via NFC node 106, and using SSID 1 immediately connects to wireless access point 110 so that the EFB 105 may exchange data with the EFB service applications 135. Because the other wireless channels remain deactivated, NFC nodes associated with the deactivated wireless channels (such as NFC node 127, for example) cannot be used to provide valid logon credentials. FIG. 2 illustrates one implementation of wireless channel activation control interface 210 comprising a first control 212 for enabling or disabling a first wireless channel and a second control 213 for enabling or disabling a second wireless channel. In some implementations, wireless channel activation control interface 210 may further include a maintenance control 214 for enabling a maintenance device to obtain access to a wireless channel from access point 110 (which may be a dedicated maintenance channel) by requesting logon credentials from one of the NFC nodes 105. It should be appreciated that the control options 212, 213, 214 provided by wireless channel activation control interface 210 may be implemented as physical switches or knobs, or alternately may be virtually implemented such as through touch screen controls for example.

As described above, embodiments of the present disclosure enable a pilot to automatically connect their EFB to the aircraft's network through a wireless connection without the need to memorize pass keys or phrases. The process is quick, and may require nothing more from the pilot than taking his or her position in the cockpit and placing their EFB near an NFC node. In some embodiments, an audible beep may be generated once the connection is made. At the same time, physical access to the cockpit, which is typically restricted during flights to non-flight crew members, is required to obtain logon credentials. In some embodiments, once those logon credentials are used once, they are no longer valid. Further, single use SSIDs ensure that only a limited, controllable, number of EFBs may be connected at any one time.

FIG. 3 is a flow chart illustrating a method 300 of one embodiment of the present disclosure. In one embodiment, the method 300 may be implemented using the secured aircraft wireless network access system 100 disclosed above with respect to FIGS. 1 and 2. As such, elements, alternatives and options discussed with respect to FIGS. 1 and 2 may be applied in any combination with the elements of method 300, and vise verse. The method 300 begins at 310 with establishing a first wireless NFC link between a first electronic flight bag (EFB) and a first Near Field Communications (NFC) node. The first NFC node is hardwired to a wireless access point and the wireless access point is coupled to one or more EFB service applications via an aircraft data network. Further, the wireless access point provides a plurality of wireless channels for accessing the aircraft data network, and each of the plurality of wireless channels are single user wireless channels. The first NFC node is located in the aircraft cockpit and may either be the only NFC node, or one of a plurality of NFC nodes in the aircraft cockpit. In some embodiment, one of the NFC nodes is located at the Pilot's (or Captain's) station which another is located at the co-Pilot's (or First Officer's) station. In some embodiments, wireless channel assignment is position sensitive such that each NFC node in the cockpit is associated with a specific and dedicated wireless channel provided by wireless access point. One or both of server authentication and client authentication may be employed by the EFB and/or the NFC node in the manner previously described.

The method proceeds to 320 where, in response to a request for access received at the first NFC node from the first EFB, the method proceeds with determining whether a wireless channel of the plurality of wireless channels is available. That is, the method determines which, if any, of the wireless channels supported by the wireless access point are currently in use. Since the wireless channels are single user channels, only one EFB may be connected to the wireless access point through the first wireless channel at a time. In one embodiment, when the first wireless channel is in use, the method may proceed to determining whether another wireless channel is available, and then proceed with the method using that wireless channel. When a connection attempt is made when all channels are already used, in some embodiments, the oldest running connection may be terminated and the channel freed and made available for the new connection. In other embodiments, such as an implementation with position sensitive wireless channel assignments, if an NFC node receiving the request for logon credentials has an associated dedicated wireless channel already in use, the pilot may be so informed so that the issue may be further investigated and/or the channel cleared for the pilots use. In still other embodiments, wireless channel activation control interface (such as wireless channel activation control interface 210) may be implemented so that a pilot can control which wireless channels are available, or how many wireless channels are available. As such, determining whether a first wireless channel of the plurality of wireless channels is available may further comprises determining whether wireless channel activation control interface have enabled the first wireless channel.

The method proceeds to 330 wherein when the first wireless channel is available, the method proceeds with generating a logon credential associated with the first wireless channel and transmitting the logon credential to the EFB with the NFC node. As discussed above, the logon credential may be transmitted in an encrypted format. The communication link between an EFB and the wireless access point is secured and encrypted so that an EFB requesting access to wireless access point must present proper logon credentials before being granted access. The logon credentials may be in the form of a pre-share key, or IEEE 802.1X authentication credentials, for example, or other authentication methods. At block 330, the logon credential is loaded to the EFB automatically in cockpit after the pilot puts the EFB in the proximity of the NFC node. After receiving the logon credentials, the EFB is immediately able to authenticate itself with wireless access point and connect with the EFB service applications. As such, the method proceeds to 340 with establishing a second wireless link between the first EFB and the wireless access point using the logon credential, and then to 350 with transferring data between the EFB and the one or more EFB server applications over the second wireless link.

The logon credential generated at block 330 is freshly generated in response to the access request from the EFB received at the first NFC node. The fresh logon credential is valid for one of the single user wireless channels provided by the wireless access point. In one embodiment, the logon credentials are freshly generated before each connection. That is, once the connection between an EFB and a wireless access point is terminated, the logon credentials provided to the EFB are voided and no access to the aircraft data network via that wireless channel are possible until new logon credentials are generated in the manner described above. In other embodiments, the logon credentials provided to an EFB remain valid for some duration, such as the duration of a specific flight, for example.

EXAMPLE EMBODIMENTS

Example 1 includes a secured aircraft wireless network access system, the system comprising: at least one server, the at least one server comprising one or more electronic flight bag (EFB) service applications; an aircraft data network comprising a network coupled to the at least one server; a wireless access point having a plurality of single user wireless channels, the wireless access point coupled to the aircraft data network; and at least one Near Field Communication (NFC) node hardwire coupled to the wireless access point, the NFC node located within the cockpit of an aircraft; wherein the at least one NFC node is configured to transmit a logon credential to a first EFB using a first wireless NFC link, the logon credential associated with a first single user wireless channel from the wireless access point, wherein the logon credential is freshly generated by the wireless access point upon receiving an access request via at least one NFC node from the first EFB; and wherein upon receiving the logon credential from the first EFB at the wireless access point, the wireless access point establishes a second wireless link over the first single user wireless channel with the first EFB that couples the first EFB to the one or more EFB service applications.

Example 2 includes the system of any of examples 1, wherein the logon credential is voided when the second wireless link is terminated.

Example 3 includes the system of any of examples 1, wherein the at least one NFC node transmits the logon credential to the first EFB in an encrypted format.

Example 4 includes the system of any of examples 1, wherein either the at least one NFC node is authenticated by the first EFB using server authentication, the first EFB is authenticated by the at least one NFC node using client authentication, or both.

Example 5 includes the system of any of examples 1, wherein the at least one Near Field Communication (NFC) node comprises at least a first NFC node and a second NFC node.

Example 6 includes the system of any of examples 5, wherein the wireless access point associates the first single user wireless channel with the first NFC node and associates a second single user wireless channel with the second NFC node.

Example 7 includes the system of any of examples 5, wherein the wireless access point generates the logon credential for one of the plurality of wireless channels based on which of the first NFC node or the second NFC node receives the access request.

Example 8 includes the system of any of examples 5, wherein first NFC node is located at a Pilot station within the cockpit and the second NFC node is located at a co-Pilot station within the cockpit.

Example 9 includes the system of any of examples 1, further comprising: a wireless channel activation control interface located in the cockpit, the wireless channel activation control interface configured to individually enable and disable each of the plurality of single user wireless channels.

Example 10 includes the system of any of examples 1, further comprising: a wireless channel activation control interface located in the cockpit, the wireless channel activation control interface configured to control how many of the plurality of single user wireless channels are enabled.

Example 11 includes a method for secured aircraft wireless network access, the method comprising: establishing a first wireless NFC link between a first electronic flight bag (EFB) and a first Near Field Communications (NFC) node, wherein the first NFC node is hardwired to a wireless access point and the wireless access point is coupled to one or more EFB service applications via an aircraft data network, wherein the wireless access point provides a plurality of wireless channels for accessing the aircraft data network, and wherein each of the plurality of wireless channels are single user wireless channels; in response to a request for access received at the first NFC node from the first EFB, determining whether a wireless channel of the plurality of wireless channels is available; when the wireless channel is available, generating a logon credential associated with the first wireless channel and transmitting the logon credential to the EFB with the NFC node; establishing a second wireless link between the first EFB and the wireless access point using the logon credential; and transferring data between the first EFB and the one or more EFB server applications over the second wireless link.

Example 12 includes the method of example 11, wherein the logon credential is voided when the second wireless link is terminated.

Example 13 includes the method of any of examples 11-12, wherein the NFC node transmits the logon credential to the first EFB in an encrypted format.

Example 14 includes the method of any of examples 11-13, wherein either the NFC node is authenticated by the first EFB using server authentication, the first EFB is authenticated by the NFC node using client authentication, or both.

Example 15 includes the method of any of examples 11-14, wherein determining whether the wireless channel of the plurality of wireless channels is available comprises determining whether a wireless channel activation control interface has enabled the first wireless channel.

Example 16 includes the method of any of examples 11-15, wherein determining whether the wireless channel of the plurality of wireless channels is available comprises determining whether a maximum number of wireless channels from the wireless access point are in use.

Example 17 includes the method of any of examples 11-16, wherein the first NFC node is one of a plurality of NFC nodes hardwired to the wireless access point, the plurality of NFC nodes further comprising at least a second NFC node.

Example 18 includes the method of example 17, wherein first NFC node is located at a Pilot station within the cockpit and the second NFC node is located at a co-Pilot station within the cockpit.

Example 19 includes the method of any of examples 17-18, wherein the wireless access point associates a first single user wireless channel with the first NFC node and associates a second single user wireless channel with the second NFC node.

Example 20 includes the method of any of examples 17-19, wherein the wireless access point generates the logon credential for one of the plurality of wireless channels based on which of the first NFC node or the second NFC node receives the access request.

In various alternative embodiments, system elements, method steps, or examples described throughout this disclosure (such as the NFC nodes or wireless access points, for example) may be implemented on one or more computer systems, field programmable gate array (FPGA), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A secured aircraft wireless network access system, the system comprising:
at least one server, the at least one server comprising one or more electronic flight bag (EFB) service applications;
an aircraft data network comprising a network coupled to the at least one server;
a wireless access point having a plurality of single user wireless channels, the wireless access point coupled to the aircraft data network; and
at least one Near Field Communication (NFC) node hardwire coupled to the wireless access point, the NFC node located within the cockpit of an aircraft;
wherein the at least one NFC node is configured to transmit a logon credential to a first EFB using a first wireless NFC link, the logon credential associated with a first single user wireless channel from the wireless access point, wherein the logon credential is freshly generated by the wireless access point upon receiving an access request via at least one NFC node from the first EFB; and
wherein upon receiving the logon credential from the first EFB at the wireless access point, the wireless access point establishes a second wireless link over the first single user wireless channel with the first EFB that couples the first EFB to the one or more EFB service applications.

2. The system of claim 1, wherein the logon credential is voided when the second wireless link is terminated.

3. The system of claim 1, wherein the at least one NFC node transmits the logon credential to the first EFB in an encrypted format.

4. The system of claim 1, wherein either the at least one NFC node is authenticated by the first EFB using server authentication, the first EFB is authenticated by the at least one NFC node using client authentication, or both.

5. The system of claim 1, wherein the at least one Near Field Communication (NFC) node comprises at least a first NFC node and a second NFC node.

6. The system of claim 5, wherein the wireless access point associates the first single user wireless channel with the first NFC node and associates a second single user wireless channel with the second NFC node.

7. The system of claim 5, wherein the wireless access point generates the logon credential for one of the plurality of wireless channels based on which of the first NFC node or the second NFC node receives the access request.

8. The system of claim 5, wherein first NFC node is located at a Pilot station within the cockpit and the second NFC node is located at a co-Pilot station within the cockpit.

9. The system of claim 1, further comprising:
a wireless channel activation control interface located in the cockpit, the wireless channel activation control interface configured to individually enable and disable each of the plurality of single user wireless channels.

10. The system of claim 1, further comprising:
a wireless channel activation control interface located in the cockpit, the wireless channel activation control interface configured to control how many of the plurality of single user wireless channels are enabled.

11. A method for secured aircraft wireless network access, the method comprising:
establishing a first wireless NFC link between a first electronic flight bag (EFB) and a first Near Field Communications (NFC) node, wherein the first NFC node is hardwired to a wireless access point and the wireless access point is coupled to one or more EFB service applications via an aircraft data network, wherein the wireless access point provides a plurality of wireless channels for accessing the aircraft data network, and wherein each of the plurality of wireless channels are single user wireless channels;
in response to a request for access received at the first NFC node from the first EFB, determining whether a wireless channel of the plurality of wireless channels is available;
when the wireless channel is available, generating a logon credential associated with the wireless channel and transmitting the logon credential to the EFB with the NFC node;
establishing a second wireless link between the first EFB and the wireless access point using the logon credential; and
transferring data between the first EFB and the one or more EFB server applications over the second wireless link.

12. The method of claim 11, wherein the logon credential is voided when the second wireless link is terminated.

13. The method of claim 11, wherein the NFC node transmits the logon credential to the first EFB in an encrypted format.

14. The method of claim 11, wherein either the NFC node is authenticated by the first EFB using server authentication, the first EFB is authenticated by the NFC node using client authentication, or both.

15. The method of claim 11, wherein determining whether the wireless channel of the plurality of wireless channels is available comprises determining whether a wireless channel activation control interface has enabled the first wireless channel.

16. The method of claim 11, wherein determining whether the wireless channel of the plurality of wireless channels is available comprises determining whether a maximum number of wireless channels from the wireless access point are in use.

17. The method of claim 11, wherein the first NFC node is one of a plurality of NFC nodes hardwired to the wireless access point, the plurality of NFC nodes further comprising at least a second NFC node.

18. The method of claim 17, wherein first NFC node is located at a Pilot station within the cockpit and the second NFC node is located at a co-Pilot station within the cockpit.

19. The method of claim 17, wherein the wireless access point associates a first single user wireless channel with the first NFC node and associates a second single user wireless channel with the second NFC node.

20. The method of claim 17, wherein the wireless access point generates the logon credential for one of the plurality of wireless channels based on which of the first NFC node or the second NFC node receives the access request.

* * * * *